(12) United States Patent
Spanke et al.

(10) Patent No.: US 8,311,651 B2
(45) Date of Patent: Nov. 13, 2012

(54) PROCESS AUTOMATION SYSTEM FOR DETERMINING, MONITORING AND/OR INFLUENCING DIFFERENT PROCESS VARIABLES AND/OR STATE VARIABLES

(75) Inventors: Dietmar Spanke, Steinen (DE); Detlev Wittmer, Maulbronn (DE); Dirk Boguhn, Kempten (DE); Jörg Herwig, Kandern (DE); Matthias Römer, Grünberg (DE); Andreas Gommlich, Karlsruhe (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 536 days.

(21) Appl. No.: 12/312,073

(22) PCT Filed: Oct. 15, 2007

(86) PCT No.: PCT/EP2007/060960
§ 371 (c)(1), (2), (4) Date: Feb. 2, 2010

(87) PCT Pub. No.: WO2008/049753
PCT Pub. Date: May 2, 2008

(65) Prior Publication Data
US 2010/0145493 A1 Jun. 10, 2010

(30) Foreign Application Priority Data
Oct. 25, 2006 (DE) .......................... 10 2006 051 102

(51) Int. Cl.
| G05B 11/01 | (2006.01) |
| G01B 3/44 | (2006.01) |
| G01B 3/52 | (2006.01) |
| G06F 11/30 | (2006.01) |
| G06F 17/40 | (2006.01) |
| G21C 17/00 | (2006.01) |

(52) U.S. Cl. ............. 700/19; 702/34; 702/183; 702/189
(58) Field of Classification Search ................... 700/19; 702/34, 183, 187; 709/243, 251
See application file for complete search history.

(56) References Cited

U.S. PATENT DOCUMENTS

| 5,799,205 A | 8/1998 | Niemann |
| RE36,263 E | 8/1999 | Janke |
| 5,970,430 A | 10/1999 | Burns |
| 8,000,816 B2 * | 8/2011 | Milanovic et al. .............. 700/19 |
| 2005/0197805 A1 | 9/2005 | Eryurek |

(Continued)

FOREIGN PATENT DOCUMENTS
DE 199 49 994 A1 4/2001
(Continued)

*Primary Examiner* — Ronald Hartman, Jr.
(74) *Attorney, Agent, or Firm* — Bacon & Thomas, PLLC

(57) ABSTRACT

A process automation system for determining, monitoring and/or influencing different process variables and/or state variables in at least one manufacturing or analytical process. Included is: at least one control station; and a plurality of field devices; wherein in each field device at least one sensor is provided for ascertaining a measured value of a process variable and/or state variable and/or an actuator is provided for influencing a process variable and/or state variable by means of an actuating value. Each field device makes available its cyclically or acyclically ascertained, measuring-device-specific, measured values and/or actuating values of the process variable and/or state variable to every other field device of the process automation system as information, and the current information of all ascertained measured values and/or actuating values of the process variables and/or state variables is available to each field device as a current process-state-vector.

13 Claims, 2 Drawing Sheets

U.S. PATENT DOCUMENTS

| | | | |
|---|---|---|---|
| 2006/0041323 A1 | 2/2006 | Chai | |
| 2007/0168057 A1* | 7/2007 | Blevins et al. | 700/53 |
| 2008/0126679 A1* | 5/2008 | Philipps | 711/103 |
| 2008/0188972 A1* | 8/2008 | Miller | 700/110 |
| 2011/0109465 A1* | 5/2011 | Jurisch | 340/635 |

FOREIGN PATENT DOCUMENTS

| | | |
|---|---|---|
| DE | 101 24 800 | 12/2002 |
| DE | 10255288 | 7/2004 |
| DE | 102004012420 | 9/2005 |
| DE | 10 2004 034 042 | 2/2006 |
| EP | 0 964 325 A1 | 12/1999 |
| GB | 2 046 476 A | 11/1980 |
| JP | 57059203 A | 4/1982 |
| JP | 57182203 A | 11/1982 |
| WO | WO 2004/048898 | 6/2004 |
| WO | WO 2005/083539 A1 | 9/2005 |

* cited by examiner

PROCESS AUTOMATION SYSTEM FOR DETERMINING, MONITORING AND/OR INFLUENCING DIFFERENT PROCESS VARIABLES AND/OR STATE VARIABLES

TECHNICAL FIELD

The present invention relates to a process automation system for determining, monitoring and/or influencing different process variables and/or state variables in at least one manufacturing or analytical process. The process automation system includes: at least one control station; and a plurality of field devices, which measure, monitor or influence the process variables and/or state variables.

BACKGROUND DISCUSSION

Fundamental progress in microelectronics and sensor technology have, in recent years, led to a miniaturization of field devices and to an integration of functionalities into the field devices, which has brought about in automation technology an effective and economical application of integrated, decentralized systems. In such field devices, embodied as sensors and actuators, not only are measured-values ascertained, but, also, the measured values are preprocessed and linearized in the sensor or in the actuator. In given cases, a self-diagnosis of the sensor or actuator is performed in the sensor or in the actuator. Prerequisite for introduction of these decentralized functionalities into a closed automation concept having "intelligent" sensors and actuators is increased information- and data-exchange of these decentralized units, among one another and/or with a control station. In process automation technology, for this reason, in recent years, a number of fieldbus systems have arisen, which relate either to company-specific areas of application (e.g. BITBUS, CAN, MODBUS, RACKBUS) or meet an international standard (e.g. HART, PROFIBUS-PA, Foundation FIELDBUS, Ethernet). The large number of fieldbus systems currently used in industrial automation and process control technology will not be explicitly explored. Instead, they will be referenced simply with the generally applicable term, "fieldbus".

Currently, for measuring arrangements including at least one sensor and/or one measurement transmitter, a plurality of diagnostic functions are provided. Thus, today, the diagnosis and monitoring of measured- or state-variables by means of warning- and alarm-limit-values of a minimum- and maximum-value belong to the state of the art.

For diagnosis of individual attributes, both methods and apparatus, e.g. in the form of measuring field devices, are known, which enable statements to be made concerning functional ability of the measuring field device or its remaining life expectancy; compare, for example, the published German Patent application DE 102 55 288 A1. Such discloses prediction of a point in time, when maximum life expectancy of the field device will probably be reached. Thus, from influencing variables registered supplementally in addition to the process variables and from estimation of their influence on life expectancy or functional ability of the field device and/or individual modules or components thereof, a statement can be made concerning remaining service life.

In published German patent application DE 10 2004 340 042 A1, on the basis of an access counter, a remaining service life prognosis is calculated for the data memory of a field device.

Published German patent application DE 10 2004 012 420 A1 takes into consideration, furthermore, also the current characteristics of the measuring environment, as well as the history of the process conditions. As a function of a loading model, thus, an evaluation of the already transpired loading of the measuring system is possible. Based on this evaluation, statements can be derived concerning remaining service life of the system. In this publication only two measured variables (pH-value, temperature) ascertained locally in the field device are taken into consideration for diagnosis as regards loading of the sensor.

Although these discussed manners of proceeding already enable a certain measure of diagnostic ability, an improved knowledge concerning the qualitative state of a measuring arrangement in measurement operation would be desirable.

Due to the decentralized distribution of the individual process components, or field devices, in a process automation system, it is necessary, that information and measured values of the individual field devices be forwarded, for the purpose of diagnosis and analysis of the field devices and their measured values, to all other process components of a process and/or to the control station, for example, via the fieldbus.

SUMMARY OF THE INVENTION

An object of the invention is to provide a decentralized process automation system, which makes available, to each field device of a process, the entire, ascertained information concerning such process.

For achieving the object, a process automation system for determining, monitoring and/or influencing different process variables and/or state variables in at least one manufacturing or analytical process is provided. The process automation system includes: at least one control station; and a plurality of field devices, which measure, monitor or influence the process variables and/or state variables. In each field device, there is provided at least one sensor for ascertaining a measured value of a process variable and/or state variable and/or one actuator for influencing a process variable and/or state variable by means of an actuating value. Each field device makes available the cyclically or acyclically ascertained, measuring-device-specific, measured values and/or actuating values of the process variable and/or state variable to every other field device of the process automation system, so that available to each field device as information are all ascertained measured values and/or actuating values of the manufacturing or analytical process and that current information of all ascertained measured values and/or actuating values of the process variables and/or state variables is available to each field device as a current process-state-vector.

An especially advantageous further development of the process automation system of the invention provides that a digital fieldbus is provided, via which the field devices communicate with the control station and among one another, wherein each of the field devices, continuously or cyclically, jointly reads the measured values and/or actuating values of the other field devices of the manufacturing or analytical process provided on the digital fieldbus and stores these jointly read, measured values and/or jointly read, actuating values as information at predetermined positions in the process-state-vector. Each field device jointly reads the measured values placed by the others on the fieldbus, and stores them, depending on characteristic variable, priority indicator and/or time stamp at predefined positions in the process-state-vector. The process-state-vector is formed directly in the individual field devices. Thus, the fieldbus is not, as in the preceding example of an embodiment, supplementally timewise occupied by the transmission of the process-state-vector from the control station. If a new field device is initialized on the fieldbus, or on a two-wire-connecting line, during operation of the process automation system, then such field device asks, for example, another field device or the control station, to provide the current process-state-vector. Through this request for transmission of the current process-state-vector, the new field device can perform in the process automation system, directly after the initializing in the fieldbus and the providing of the process-state-vector, the diagnosis of the measured values and the field device function, as well as the plausibility monitoring of the measured values.

In a preferred form of embodiment of the invention, it is provided, that the individual field devices transmit the field-device-specific, measured values and/or the field-device-specific, actuating values, via a two-wire-connecting line and/or a fieldbus, to the control station cyclically or upon request, and the control station transmits the collected information in the form of the process-state-vector, cyclically or upon request of the field devices, to all field devices. In this embodiment of the invention, the individual measured values of a process are collected in the control station and arranged and stored in a process-state-vector. This process-state-vector is then transmitted at the same time to each individual field device, so that in each field device the same process-state-vector is present for additional processing.

In an additional preferred embodiment of the process automation system of the invention, it is provided, that a control/evaluation unit is present in the field devices and/or in the control station, wherein the control/evaluation unit uses the information of the process-state-vector for reviewing plausibility of the current measured values ascertained with the field device and/or the current actuating values of the current process variable and/or for function-diagnosis of the field device. On the basis of the measured values stored in the process-state-vector of other field devices in the process, a plausibility review of the measured value ascertained in the current field device can be done. For example, in the case of measuring the draining of fill substance from the container through a flow measuring device, taking into consideration the container geometry, a fill level change can be deduced. The calculated fill level change and the fill level change measured with a fill-level measuring device can be compared with one another, and, thus, a statement made concerning accuracy, and reproducibility, of the measured value.

In an advantageous form of embodiment of the invention, a control/evaluation unit is provided in the field devices and/or in the control station, wherein the control/evaluation unit ascertains, from the information of the process-state-vector and from a predetermined mathematical model, the life expectancy and/or need for maintenance of the field device and/or individual electronics modules and/or the total system.

Another advantageous embodiment of the invention is that in which a control/evaluation unit is provided in the field devices and/or in the control station, wherein the control/evaluation unit analytically and/or numerically derives from the information of the process-state-vector at least one other measured value characterizing the process. Some process variables and/or state variables, such as, for example, the density of the fill substance, cannot be ascertained directly by means of a sensor. The control/evaluation unit in the field device derives this density, for example, from a plurality of pieces of information of the process-state-vector.

In an especially preferred form of embodiment of the invention, it is provided, that, in the case of use of a process automation system in at least two manufacturing or analytical processes, the process-state-vector is supplied with a characteristic variable characterizing the manufacturing or analytical process and serving for identification and/or for grouping of all ascertained measured values of the field devices with the manufacturing or analytical process to which they belong. Through this characterizing characteristic variable, it is possible to assign the individual measured values of the different field devices to the processes with which they are associated. To this end, it is provided, that this indicator is stored in the field device, so that the field device can be associated with a certain process. This associating of the measured values to a process is necessary, since, in the case of diagnosis of the measured values or the states of the field devices and/or in the case of plausibility review of the measured values of the field devices, then such will be on the basis of equal process conditions and measuring conditions.

A purpose-supporting embodiment of the invention includes providing in the process-state-vector a time stamp characterizing the point in time of the ascertaining of the measured values. This time stamp is utilized, in order to collect measured values, which were ascertained at the same point in time or in a predefined period of time, together in a process-state-vector. In this way, it is assured, that older measured values are not compared with younger measured values, in case, for example, process conditions have changed in the intervening time. Furthermore, for a trend- or historical-investigation of the measured values, the point in time of their determining is necessary, in order that an informative and time-based presentation of the trend or the history of the measured values can be performed. For forming the time average of the measured values, for example, from the time stamp, the time span is ascertained, in which the measured values were ascertained. Moreover, by the association of the measured values to the point in time of their registering, signals as a function of time and trends can be ascertained. From a trend, for example, also a statement concerning the aging behavior of the sensor or actuator can be made.

In an advantageous form of embodiment of the process automation system of the invention, it is provided, that the individual measured values and/or actuating values of the process variables and/or state variables are arranged at predetermined locations in the process-state-vector. Through unified arrangement of the different measured values, such as e.g. pressure, temperature, fill level, flow, e.g. flow rate, pH-value, conductivity and viscosity, in the process-state-vector, the position of a measured value is fixed in the process-state-vector. Therefore, for example, the measured value does not have to carry units in the process-state-vector, in order that it can be identified. Stored in the field device is the information concerning at which position in the process-state-vector the specific measured value is located, what units it has and its order of magnitude. If, in a process, a certain measured value cannot, based on, for example, a missing, or malfunctioning, field device, be ascertained, then stored at its position in the process-state-vector is a zero, or some other indicator that no measured value is present.

A supplementing embodiment of the invention includes, that a priority designation of the measured values is provided, for indicating rank of the record of the measured value or actuating value in the process-state-vector when a plurality of measured values or actuating values of a single process variable exists. For example, based on the accuracy of measurement, with which a measured value was ascertained by a field device, a priority indicator is assigned, which fixes, which measured value of a plurality of measured values of the process variable, e.g. temperature, is entered in the process-state-vector. Furthermore, the priority indicator establishes, that measured values of the same process variable with a lower priority in the process-state-vector can be over-written by higher-ranked, measured values.

An advantageous embodiment of the invention provides that the control- and evaluation-unit encrypts the information of the process-state-vector. Through the encryption of the information of the process-state-vector, only selected field devices can jointly read and again decode the information of the process-state-vector. Through the encryption of the process-state-vector, the information and measured values concerning the process are protected.

An advantageous form of embodiment of the invention includes that, in each field device or in the control station, historical information concerning older measured values and/or older actuating values is stored with the current information of current measured values in a process-state-matrix. For determining the curve as a function of time and/or the trend of the measured- and actuating-values, it is advantageous to have the current and older values present in a fixed form.

In an advantageous form of embodiment of the invention, it is provided, that the control/evaluation unit ascertains, from the current information and the historical information, the life expectancy and/or need for maintenance of the field device and/or checks the plausibility of the current measured value and/or current actuating values of the current process variable ascertained with the field device and/or ascertains the function-diagnosis of the field device and/or the trend of the measured values.

BRIEF DESCRIPTION OF THE DRAWINGS

The invention and selected examples of embodiments will now be explained in greater detail on the basis of the appended drawings. For simplification in the drawings, identical parts have been provided with the equal reference characters. The figures of the drawings show as follows.

DETAILED DISCUSSION WITH REFERENCE TO THE DRAWINGS

Figure 1:
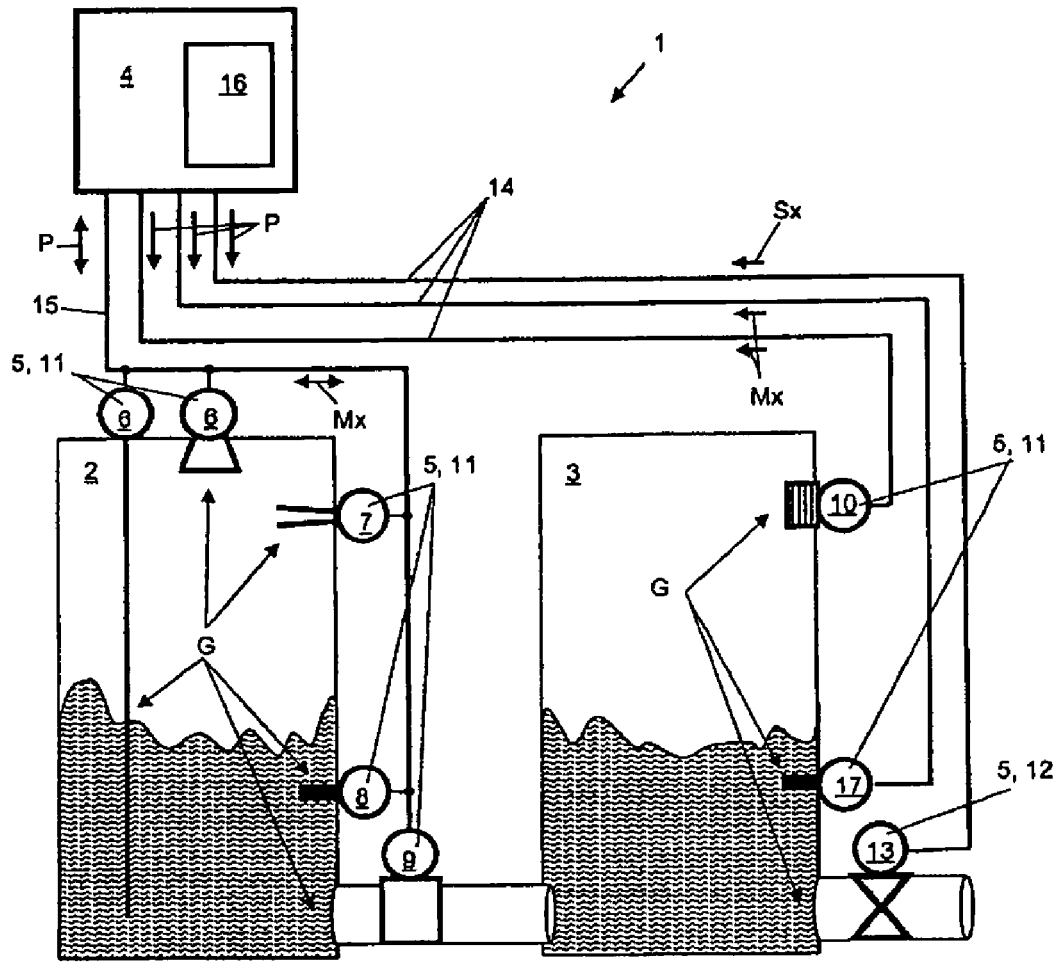
FIG. 1 is a schematic drawing of a process automation system of the invention.

FIG. 1 shows a process automation system 1 of the invention. Process automation system 1 is constructed of a control station 4 and a plurality of field devices 5 distributed between a container of a first process 2 and a container of a second process 3. The individual field devices 5 communicate among one another and with the control station 4 via a fieldbus 15 and/or two-wire-connecting lines 14. Integrated in the control station 4 is a control- and evaluation-unit 16, which carries out the control of the automation process, evaluation of the measured values Mx or actuating values Ax of the individual field devices 5 and/or analysis and diagnosis of the information I and the measured values Mx of the field devices 5. A process variable G, or procedure variable, is a physical variable, which occurs exclusively in the case of state changes and, as a result, is path dependent. The measured values Mx and actuating values Ax are values of process variables G or state variables Z of the process 2, 3 ascertained from the sensor 11 or actuator 12 of the field devices 5.

In the first process 2 in FIG. 1, for example, two fill level measuring devices 6, a limit-level measuring device 7 and an analytical measuring device 8 are provided. Integrated between the containers of the first process 2 and the second process 3 is a flow measuring device 9, which ascertains transport of fill substance between the two containers of the processes 2, 3. The field devices 5 of the first process 2 communicate via a digital fieldbus 15, such as e.g. Profibus PA or Foundation Fieldbus, with one another and/or with the control station 4. Analogously to hardwired communication via a digital fieldbus 15, communication can also be accomplished via a corresponding wireless communication unit according to known standards, such as e.g. ZigBee, WLAN and Bluetooth. This is, however, not explicitly embodied in the illustrated example of an embodiment of FIG. 1.

Integrated in the second process 3, for example, as field devices 5 are a pressure measuring device 10, a temperature measuring device 17 and an actuator 13 for operating a valve, these communicating via a direct two-wire-connecting line 14 with the control station 4 or among one another. Communication via the two-wire-connecting line 14 occurs, for example, according to the HART-standard, which modulates onto an analog, 4-20 mA, electrical current signal a digitized, high-frequency signal as an additional information carrier.

In the current state of the art, only measured values Mx and/or information I concerning the process 2, 3 are known, which are ascertained in or from the field device 5 itself. However, this information I concerning the process 2, 3 is not sufficient for calculating the need for maintenance or the life expectancy of the field device 5. In order currently in the case of field devices 5 to obtain a statement concerning their life expectancy or need for maintenance, on the one hand, information I is derived from the measured values Mx directly present in the field device 5. On the other hand, however, also other measured values Mx of other process variables G and/or state variables Z are necessary for an exact and/or expanded, diagnostic function of the field device 5, and these cannot be measured directly or indirectly by means of the one sensor 11 in the field device 5. Furthermore, it is, for reasons of cost and/or space, most often, however, not possible to integrate in the field device 5 an additional sensor 11 for measuring the measured values Mx of a process variable G needed for the diagnosis. Most often, the additional information I of the process 2, 3 is, however, already present by way of other field devices 5 of the individual processes 2, 3 distributed in the process automation system 1 and must only be appropriately provided. A place in the process automation system 1, where all information I of the process 2, 3 comes together, is, for example, the control station 4. Various field devices 5 of different manufacturers can be connected to the control station 4. The algorithms for executing the calculatory functions and diagnostic functions in the field device 5 are only known to the manufacturer of the device. It is, thus, a disadvantage to implement the device-specific algorithms of the calculatory functions and diagnostic functions directly in the control station 4, since it is then necessary to store and, when required, to invoke all device-specific algorithms of the different field devices 5 of different manufacturers in the control station 4. For these reasons, it is of advantage, to implement the calculation of life expectancy and the diagnosis directly in the field devices 5, since, in this case, only the one device-specific algorithm of the calculatory functions and diagnostic functions needs to be present in the field device 5. However, it is then also necessary, that all information I of the process P needed for execution of the algorithm be available to the field device 5. A first form of embodiment of the invention is, therefore, that, in the control station 4, all measured values Mx are collected as information I in the form of a unified process-state-vector P and this unified process-state-vector P is transmitted to the field devices 5 of the process 2, 3. In the field devices 5, for example, by means of the additional information I of the created process-state-vector P, calculations for life expectancy of the sensor 11 or the field device 5 or for a plausibility determination of the measured value Mx of the field device 5 can be performed. Furthermore, it is possible through direct comparison of the different measured values Mx of a shared process variable G to lessen the measurement error, and/or measurement uncertainty, of the measuring. Available to each field device 5 is, separated according to the processes, the same information I in the form of a unified process-state-vector P. The associating of the field devices 5 to the individual processes 2, 3 occurs, for example, by means of a characteristic variable K characterizing the manufacturing or analytical process and assigned to the measured values Mx on the fieldbus 15 or the two-wire-connecting lines 14, thus enabling an assigning of the individual measured values Mx to the process-state-vector P describing the relevant process 2, 3. An advantage of this embodiment is, that the operator of a process automation system need not exactly know, which additional information I of the individual connected field device 5 is required, but, instead, the field device fetches the necessary additional information I from a uniform process-state-vector P.

In a second form of embodiment of the invention, the measured values Mx of the individual field devices 5 of a particular process 2, 3 are transmitted according to a standardized transmission protocol, such as e.g. Profibus PA or Fieldbus Foundation, via the digital fieldbus 15. The corresponding measured values Mx are jointly read by each individual field device 5 on the digital fieldbus 15 and stored in a control-evaluation unit 16 in memory as a process-state-vector P. The automatic, joint reading of the different measured values Mx on the digital fieldbus 15 and the automatic placing of the different measured values Mx in a process-state-vector P is then possible, because the different measured values Mx are unequivocally identifiable. This can be effected by a system-wide, unique identifier, such as e.g. a bus address of the field device 5, by associating with the identifier a physical/chemical measured variable for the field device 5 or the sensor 11, along with the dimension of the measured variable—thus, for example, temperature in degrees Celsius.

Alternatively, the different measured values Mx of a process 2, 3 can be characterized on the digital fieldbus by a designating element specifying the measured value Mx. Associated with the measured values Mx and actuating values Ax transmitted via the two-wire-connecting lines 14 or the fieldbus 15 to the additional field devices 5 and/or the control station 4 is a designating element, on the basis of which the measured values Mx are associated in the dimension and unit of measurement of the corresponding process variable G. For example, in the case of the transmission of temperature as measured value, the unit of measurement, degrees Celsius, and the order of magnitude, 1, are sent via the fieldbus 15 or the four-wire-connecting line 14 as designating element of the measured value Mx. An option is also to transmit as designating element a predefined variable via the fieldbus 15 or the two-wire-connecting line 14. The predefined variable is stored in the field device 4 in the control- and evaluation-unit 16 in combination with a unit of measurement characterizing the measured value Mx and with an order of magnitude of the corresponding measured value Mx.

The specific measured values Mx of each field device 5, such as e.g. temperature, pressure, pH-value in the process 2, 3, are stored by the control- and evaluation-unit 16 in the field device of the process-state-vector P at a predetermined position in the process-state-vector P. Each control- and evaluation-unit 16 in a field device 5 knows on the basis of the unified arrangement of the individual, different, measured values Mx, the position in the process-state-vector, where the corresponding measured value M, such as e.g. the pressure value, is stored. This second embodiment has the advantage, that, for example, the knowledge concerning the calculation of the life expectancy as a function of all process variables G and/or state variables Z and/or state variables Z no longer can be calculated only in the control station 4, but, instead, that this diagnosis and analysis can occur directly in and by the field device 5.

In the following, a selection of application examples of the process-state-vector in a process automation system 1 is presented.

In addition to determining pH-value by means of an analytical measuring device 8, also the process pressure is calculated as information I. From this, for example, the next date for a recalibration, or the life expectancy of the pH-electrode, can be calculated in the field device 5.

The propagation velocity of a freely radiating, fill-level measuring device 6 utilizing microwave radiation is pressure-dependent. For calculating the exact travel time of a microwaves-pulse and, thus, for determining exact fill level of a fill substance in a container, the exact pressure in the process 2, 3 must be known. From the process-state-vector P, the fill-level measuring device 6 reads the measured value Mx of pressure of the pressure measuring device 10 from the same process 2, 3. Thus, an exact measuring of the fill level is made possible, taking into consideration the exact pressure in the process 2, 3.

In the case of a fill-level measuring device 6 ascertaining fill level in a container of the process 2, 3 by means of travel time of an ultrasonic-pulse, a temperature sensor is integrated in the ultrasonic transducer for determining temperature of the process 2, 3. Through a measured value Mx of the temperature from the process-state-vector P, for example, of a temperature measuring device 17 in the same process, it is possible to conduct a plausibility determination of the measured value ascertained with the temperature sensor of the ultrasonic transducer. When the distribution of the field devices 5 in processes 2, 3 is known, then, also, plausibility can be determined between the measured values Mx.

Figure 2:
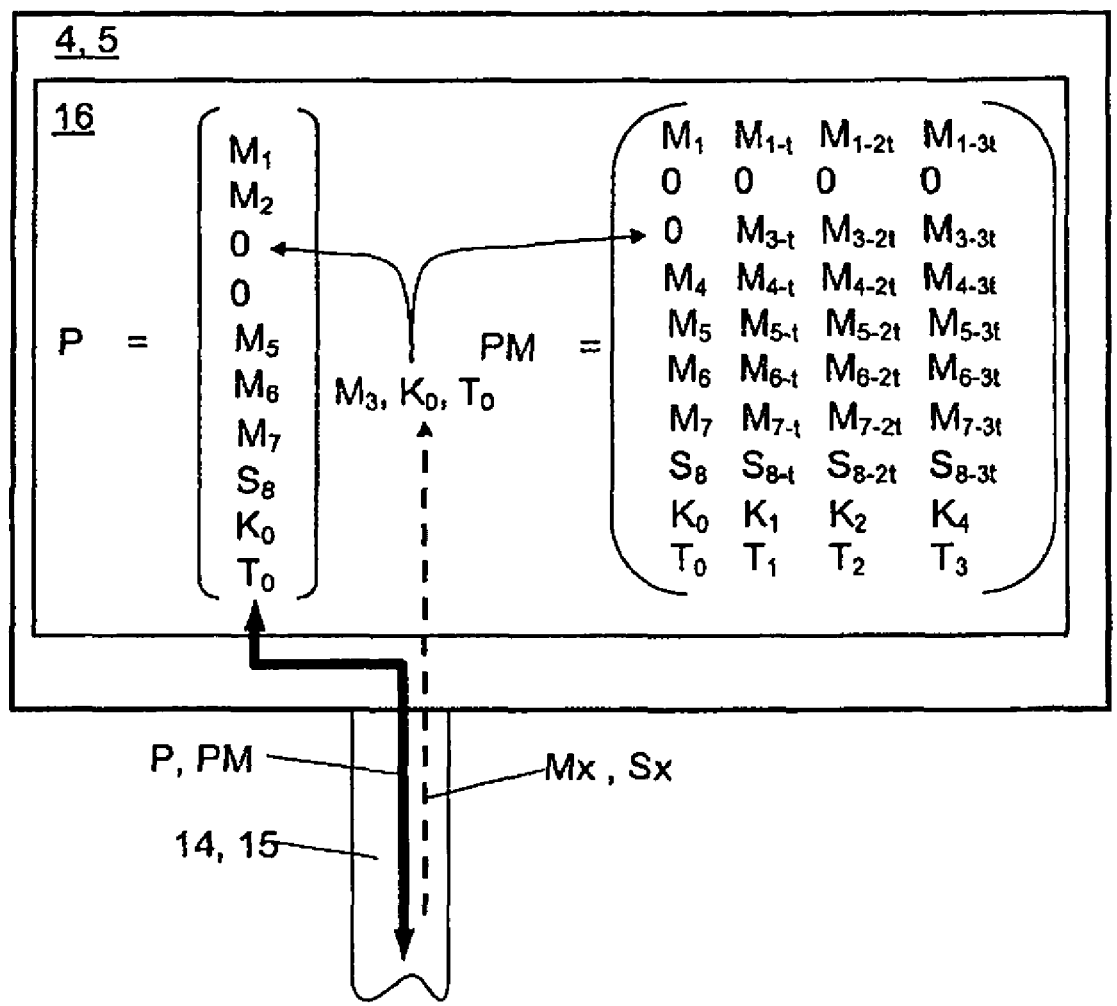
FIG. 2 is a schematic drawing of a field device, or a control station, having a control/evaluation unit for registering the process-state-vector or a process-state-matrix.

FIG. 2 illustrates production of a process-state-vector P and/or a process-state-matrix PM in the control/evaluation unit 16 in a field device 5 or in a control station 4. Via the fieldbus 15 or the two-wire-connecting lines 14, the individual measured values Mx and/or actuating values Ax are collected and stored at their appropriate positions in the process-state-vector P or in the process-state-matrix PM. On the basis of the characteristic variable Kx and the time stamp Tx, the measured values Mx or the actuating values Ax of the processes 2, 3 are associated with the appropriate process-state-vector P or a column in the process-state-matrix PM. The registering point in time, or registering time period, of the ascertaining of the measured values Mx and/or actuating values located in this column is stored, for example, as a time stamp in the last row of the corresponding column, so that the time behavior of the measured values Mx and actuating values Ax in the process-state-matrix PM can be ascertained. The measured values Mx-t and/or the actuating values Ax-t are characterized according to their assignment to a current time stamp Tx. As already described above, the measured values Mx and/or the actuating values Ax are either jointly read directly on the fieldbus 15 by the connected field devices 5 and stored in the field devices 5 and at the assigned positions in the process-state-vector P or the process-state-matrix PM, or the measured values Mx and actuating values Ax are collected in a central unit, e.g. the control station 4, as process-state-vector P or process-state-matrix PM and the entire process-state-vector P or the entire process-state-matrix PM is sent via the fieldbus 15 or the two-wire-connecting line 14 back to the individual field devices 4. Thus, present at the same time and conformedly in each field device 4 are all ascertainable measured values Mx and/or all settable actuating values Ax of the state variables Z and/or process variables G of the process 2, 3.

The invention claimed is:

1. A process automation system for determining, monitoring or influencing different process variables or state variables in at least one manufacturing or analytical process, comprising:
at least one control station; and
a plurality of field devices, which measure, monitor or influence the process variables or state variables; wherein:
in each said field device, at least one sensor for ascertaining a measured value of a process variable or state variable, or one actuator for influencing a process variable or a state variable by means of an actuating value, is provided;
each said field device makes available to every other field device of the process automation system cyclically or acyclically ascertained, measuring-device-specific, measured values or actuating values of the process variable or state variable, so that all ascertained measured values or actuating values of the manufacturing or analytical process are available as information to each said field device; and
said current information for all ascertained measured values or actuating values of the process variables or state variables is available to each said field device as a current process-state-vector.

2. The process automation system as claimed in claim 1, further comprising:
a digital fieldbus that said field devices use to communicate with said control station and one another, wherein:
each of said field devices, continuously or cyclically, jointly reads measured values or actuating values provided from said other field devices of the manufacturing or analytical process on said digital fieldbus and stores the jointly read, measured values or jointly read, actuating values as information at predetermined positions in the process-state-vector.

3. The process automation system as claimed in claim 1, wherein:
an individual one of said field devices transmits the field-device-specific, measured values and/or field-device-specific actuating values via a two-wire-connecting line or a fieldbus to said control station cyclically or upon request of said control station; and
said control station transmits collected information cyclically or up request of said field devices to all field devices as the process-state-vector.

4. The process automation system as claimed in claim 1, further comprising:
a control or evaluation unit in said field devices or said control station, wherein:
said control or evaluation unit applies said information of the process-state-vector for reviewing plausibility of current measured values or current actuating values of the current process variable or state variable ascertained with the field device or for function-diagnosis of the field device.

5. The process automation system as claimed in claim 1, further comprising:
a control or evaluation unit in said field devices or said control station, wherein:
said control or evaluation unit ascertains, from the information of the process-state-vector, life expectancy of said field device or need for maintenance of said field device.

6. The process automation system as claimed in claim 1, further comprising:
a control or evaluation unit in said field devices or said control station, wherein:
said control or evaluation unit analytically or numerically derives from the information of the process-state-vector at least one other, indirect, measured value characterizing the process.

7. The process automation system as claimed in claim 1, wherein:
in use of a process automation system in at least two manufacturing or analytical processes, a characteristic variable characterizing the manufacturing or analytical process is associated with said process-state-vector and serves for identification or for grouping of all ascertained measured values of said field devices from the same manufacturing or analytical process.

8. The process automation system as claimed in claim 1, wherein:
in said process-state-vector, a time stamp is provided for characterizing a point in time of ascertaining the measured values.

9. The process automation system as claimed in claim 1, wherein:
the individual measured values or actuating values of the process variables or state variables are arranged at predetermined locations in said process-state-vector.

10. The process automation system as claimed in claim 1, wherein:
a priority designation of the measured values or the actuating values is provided, which fixes rank of a record of the measured value or the actuating value in said process-state-vector in the case of a plurality of measured values or actuating values for a particular process variable.

11. The process automation system as claimed in claim 1, further comprising:
a control- and evaluation-unit encrypts the information of said process-state-vector.

12. The process automation system as claimed in claim 1, wherein:
in each said field device or in said control station, a historical information of older measured values or older actuating values is stored with the current information for current measured values or current actuating values in a process-state-matrix.

13. The process automation system as claimed in claim 12, wherein:
said control or evaluation unit ascertains, from the current information and the historical information, life expectancy or need for maintenance of said field device or reviews plausibility of current measured value or current actuating values of the current process variable or state variable ascertained with said field device or ascertains function-diagnosis of said field device or trend of the measured values or actuating values.

* * * * *